(12) United States Patent
Kluz et al.

(10) Patent No.: US 10,107,409 B2
(45) Date of Patent: Oct. 23, 2018

(54) MULTI-FUNCTION VALVE

(71) Applicant: Marotta Controls, Inc., Montville, NJ (US)

(72) Inventors: Krzysztof Kluz, Saddle Brook, NJ (US); Joseph Youssef, Bridgewater, NJ (US)

(73) Assignee: Marotta Controls, Inc., Montville, NJ (US)

( * ) Notice: Subject to any disclaimer, the term of this patent is extended or adjusted under 35 U.S.C. 154(b) by 587 days.

(21) Appl. No.: 14/740,492

(22) Filed: Jun. 16, 2015

(65) Prior Publication Data

US 2016/0369910 A1    Dec. 22, 2016

(51) Int. Cl.
*F16K 31/00* (2006.01)
*F16K 1/00* (2006.01)
*H02N 2/00* (2006.01)
*H02N 2/04* (2006.01)

(52) U.S. Cl.
CPC .............. *F16K 31/004* (2013.01); *F16K 1/00* (2013.01); *H02N 2/0055* (2013.01); *H02N 2/043* (2013.01)

(58) Field of Classification Search
CPC ....... F16K 31/004; F16K 1/00; H02N 2/0055; H02N 2/043
USPC .................................................. 310/334, 317
See application file for complete search history.

(56) References Cited

U.S. PATENT DOCUMENTS

| 4,808,874 A | 2/1989 | Stahlhuth |
| 6,206,341 B1 | 3/2001 | O'Neill |
| 6,520,479 B1 * | 2/2003 | Sato ...................... F16K 31/007 251/129.06 |
| 6,994,110 B2 | 2/2006 | Barillot et al. |
| 2004/0035106 A1 | 2/2004 | Moler et al. |
| 2005/0121637 A1* | 6/2005 | Adams ...................... F01L 1/46 251/129.15 |
| 2007/0163297 A1 | 7/2007 | Zhang et al. |
| 2008/0295805 A1* | 12/2008 | Laumen ................. F02M 47/00 123/456 |

(Continued)

FOREIGN PATENT DOCUMENTS

| DE | 102005014866 A1 | 10/2006 |
| DE | 102009002836 A1 | 11/2010 |

(Continued)

OTHER PUBLICATIONS

European Search Report for Application No. EP16174810 dated Nov. 1, 2016.

*Primary Examiner* — Bryan Gordon
(74) *Attorney, Agent, or Firm* — Lerner, David, Littenberg, Krumholz & Mentlik, LLP

(57) ABSTRACT

A valve is disclosed and comprises a main valve body having first and second ports and a movable poppet positioned within the main valve body. The movable poppet is moveable from a first closed position in which the poppet establishes a fluid-tight seal with a sealing member, which is effective to prevent fluid flow from the first port to the second port, to a second open position in which the poppet is spaced apart from the sealing member and fluid is permitted to flow from the first port to the second port. The valve also has a piezoelectric actuator engaged with the poppet and effective to move the poppet from the first closed position to the second open position. Methods of use of the valve are also disclosed.

12 Claims, 5 Drawing Sheets

(56) References Cited

U.S. PATENT DOCUMENTS

2016/0258403 A1* 9/2016 Marrack ................. F16K 31/44

FOREIGN PATENT DOCUMENTS

| EP | 2833042 A1 | 2/2015 |
|---|---|---|
| FR | 2743129 A1 | 7/1997 |

* cited by examiner

MULTI-FUNCTION VALVE

BACKGROUND OF THE INVENTION

The present invention relates, in general, to a multi-function valve usable in a variety of different circumstances.

Valves and valve systems are available to function for pressure-relief purposes, pressure-reduction, or pressure regulation. Existing valves, however, typically focus on one of the foregoing functionalities. The valves can have a mechanical or electronic control system. Mechanical valves have fast response and relatively large flow capacity, but their excessive size and weight prohibits them from use in many applications. Moreover, mechanical valves have one set point, which cannot be changed remotely. On the other hand, electronic control valves, due to the performance of the actuator generally used therewith, are limited to low-flow or slow-response applications. Often a separate control system relying on the feedback from a sensor apart from a main valve unit is required.

A need therefore exists for a versatile valve capable of performing a multitude of functions in an effective manner.

BRIEF SUMMARY OF THE INVENTION

A first aspect of the invention includes a valve comprising a main valve body having a first port in fluid communication with a first conduit and a second port in fluid communication with a second conduit. The valve also has a movable poppet positioned within the main valve body, the movable poppet being moveable from a first closed position in which the poppet establishes a fluid-tight seal with a sealing member, which is effective to prevent fluid flow from the first port to the second port, to a second open position in which the poppet is spaced apart from the sealing member and fluid is permitted to flow from the first port to the second port. A piezoelectric actuator is also engaged with the poppet and effective to move the poppet from the first closed position to the second open position.

In an embodiment of this first aspect, the piezoelectric actuator includes a piezoelectric element coupled with an electronic cable, the electronic cable being effective to charge and discharge the piezoelectric element and cause the element to correspondingly expand or contract. The valve may also further comprise a sensor and an electronic control board, wherein the sensor is communicatively coupled with the electronic control board and the electronic control board is effective to accept readings from the sensor and issue a command causing the piezoelectric actuator to move the poppet from its first closed position to its second open position.

A second aspect of the invention includes a valve comprising a main valve body having a first port, a second port, and a fluid path extending from the first to the second port. The valve has movable poppet positioned within the main valve body, the movable poppet being moveable to a plurality of different positions effective to place the fluid path in a closed, partly-open, or open state, and a piezoelectric actuator having a piezoelectric element and a frame, the frame being engaged with the poppet and effective to move the poppet amongst the plurality of different positions. A sensor is included with the valve to ascertain an environmental condition of the valve, and an electronic control board is communicatively coupled with the sensor, wherein the sensor transmits readings pertaining to the valve's environmental condition to the electronic control board, and the electronic control board is effective to accept such readings and issue a command causing the piezoelectric actuator to move the poppet from a first of its plurality of different positions to a second of its plurality of different positions. In an embodiment, the sensor is at least one of a pressure sensor, a flow sensor, and a temperature sensor.

A third aspect of the invention includes a method of operating a valve comprising: (1) providing a valve having a main valve body with a first port, a second port, and a fluid path extending from the first port to the second port; (2) sensing an environmental condition of fluid flowing from the first port towards the second port by way of a sensor positioned in the main valve body; and (3) charging or discharging a piezoelectric element of a piezoelectric actuator in response to a triggering event sensed by the sensor, the charging or discharging causing a poppet engaged with the piezoelectric actuator to move between a first position in which the fluid path is sealed and a second position in which the fluid path is open or partly open. In an embodiment, the sensor is at least one of a pressure sensor, a flow sensor, and a temperature sensor, and the triggering event occurs when the sensor senses that at least one of the pressure, flow, and temperature of the fluid flowing from the inlet towards the outlet is outside of a predetermined value or range of values.

BRIEF DESCRIPTION OF THE DRAWINGS

A more complete appreciation of the subject matter of the present invention and of the various advantages thereof can be realized by reference to the following detailed description in which reference is made to the accompanying drawings in which.

DETAILED DESCRIPTION

In describing certain aspects of the present invention, specific terminology will be used for the sake of clarity. However, the invention is not intended to be limited to any specific terms used herein, and it is to be understood that each specific term includes all technical equivalents, which operate in a similar manner to accomplish a similar purpose.

Figure 1:
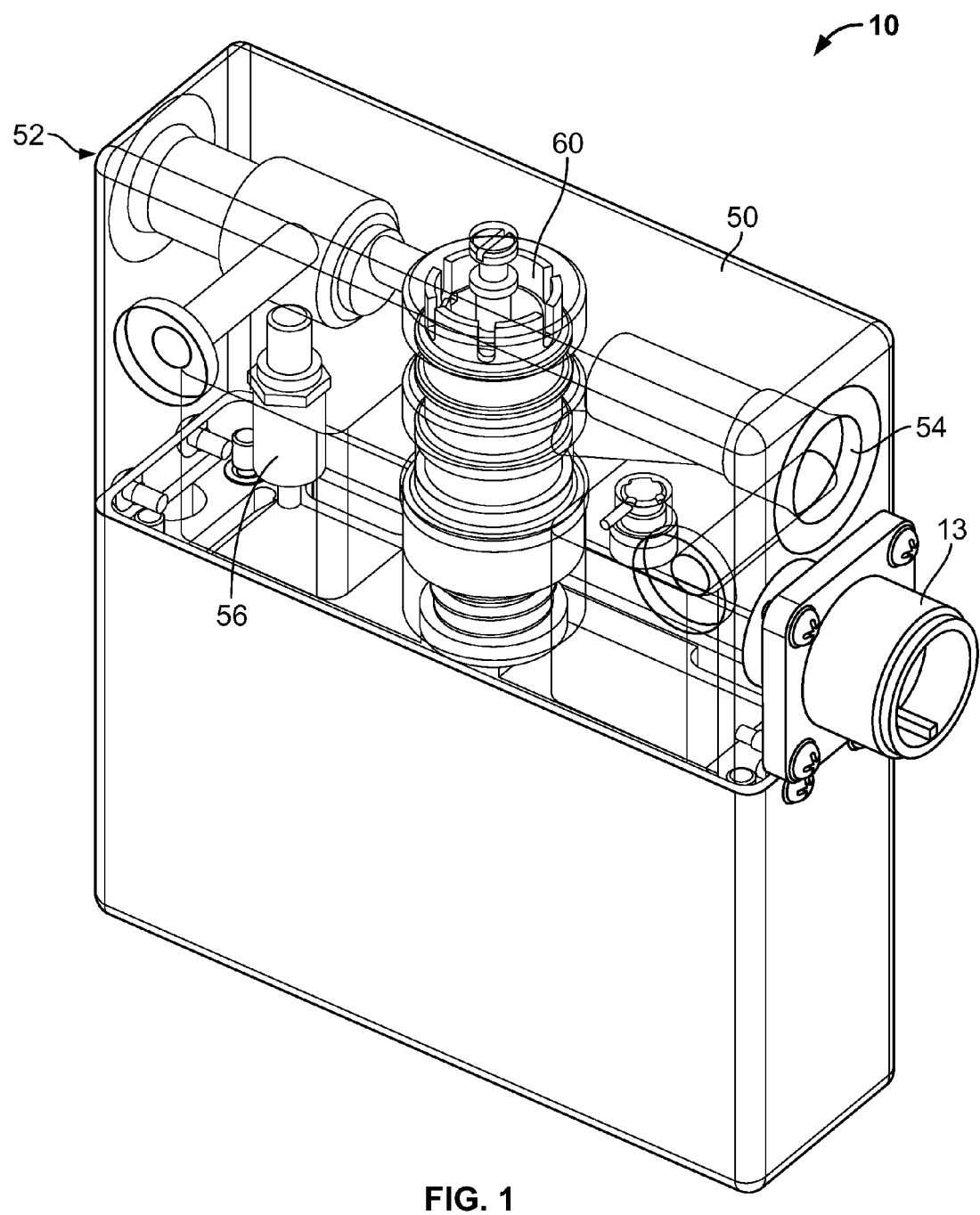
FIG. 1 is a perspective, semi-transparent view of a valve according to an embodiment of the invention.

FIG. 1 depicts a valve 10, which includes a main valve body 50 having a first port 52 and another second port 54. Depending on the mode of use, ports 52 and 54 can be used as an inlet or outlet. During use as a pressure-reduction mechanism, port 54 of valve 10 is an inlet. In a pressure-relief (or back pressure regulator) mode, port 52 of valve 10 becomes the inlet. Valve 10 includes a poppet 80 that is movable within main valve body 50 for controlling the flow of fluid into and out of ports 52, 54. Main valve body 50 is also associated with an electronic control board 12 and a piezoelectric actuator 30 for controlling the movement of poppet 80, and thus, the flow of fluid through main valve body 50. Valve 10 can therefore act as a multi-function valve to achieve pressure relief, pressure reduction, and/or pressure regulation in a manner described in more detail below.

Figure 2:
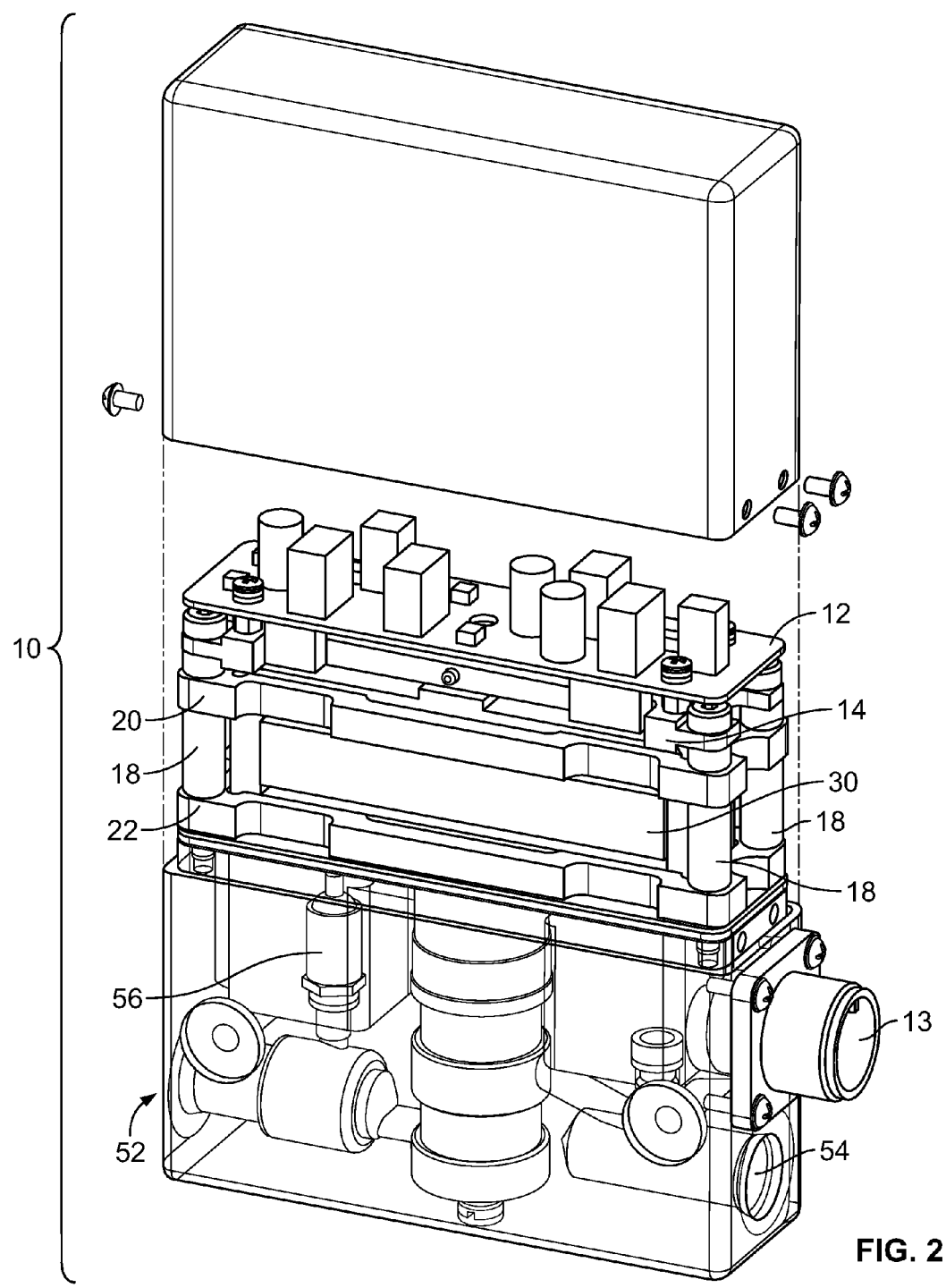
FIG. 2 is an exploded, semi-transparent view of the valve of FIG. 1.

As shown in FIG. 2, electronic control board 12 of valve 10 sits atop main valve body 50 and acts to control movement of piezoelectric actuator 30. Electronic control board 12 may therefore include a variety of common electronic components, such as one or more processors, a memory, and other circuitry generally required for controlling piezoelectric actuator 30 (and thus valve 10), as hereinafter described. Alternatively, electronic control board 12 may be an analog component having common analog structures for controlling piezoelectric actuator 30 (and thus valve 10). Electronic control board 12 is connected (wirelessly or through wired means) to a sensor or transducer 56, which in an embodiment is a pressure transducer. Other sensors/transducers may be used alone or in combination with pressure transducer 56, such as flow sensors, temperature sensors, etc. It is to be understood that references herein to pressure transducer 56 include a variety of sensors/transducers, as described above, which may be used alone or in addition to pressure transducer 56.

Electronic control board 12 is coupled to pressure transducer 56. In an embodiment, electronic control board 12 is configured to receive a signal from pressure transducer 56 and compare the signal to a pre-set voltage value controlled by a board-installed variable resistor. If the signal received from pressure transducer 56 is outside the set value, electronic control board 12 issues a command causing a flow condition of valve 10 to change (e.g., piezoelectric actuator 30 to move and adjust a flow condition of valve 10). For instance, electronic control board 12 may be configured so that a predetermined pressure reading at pressure transducer 56 causes control board 12 to issue a command or electronic signal to piezoelectric actuator 30, thereby causing piezoelectric actuator 30 to move. In a particular embodiment, electronic control board 12 directly or indirectly causes a voltage to be applied or discharged from piezoelectric actuator 30 resulting in movement thereof. A voltage may be applied or discharged from piezoelectric actuator via its wiring/electronic cable 35, as detailed below. In addition to autonomous operation as described above, the set voltage controlled by the adjustable resistor can be modified via a signal provided through electrical connector 13. In this case, the variable resistor electronic loop is bypassed to give the ability to control valve 10 remotely.

Figure 3:
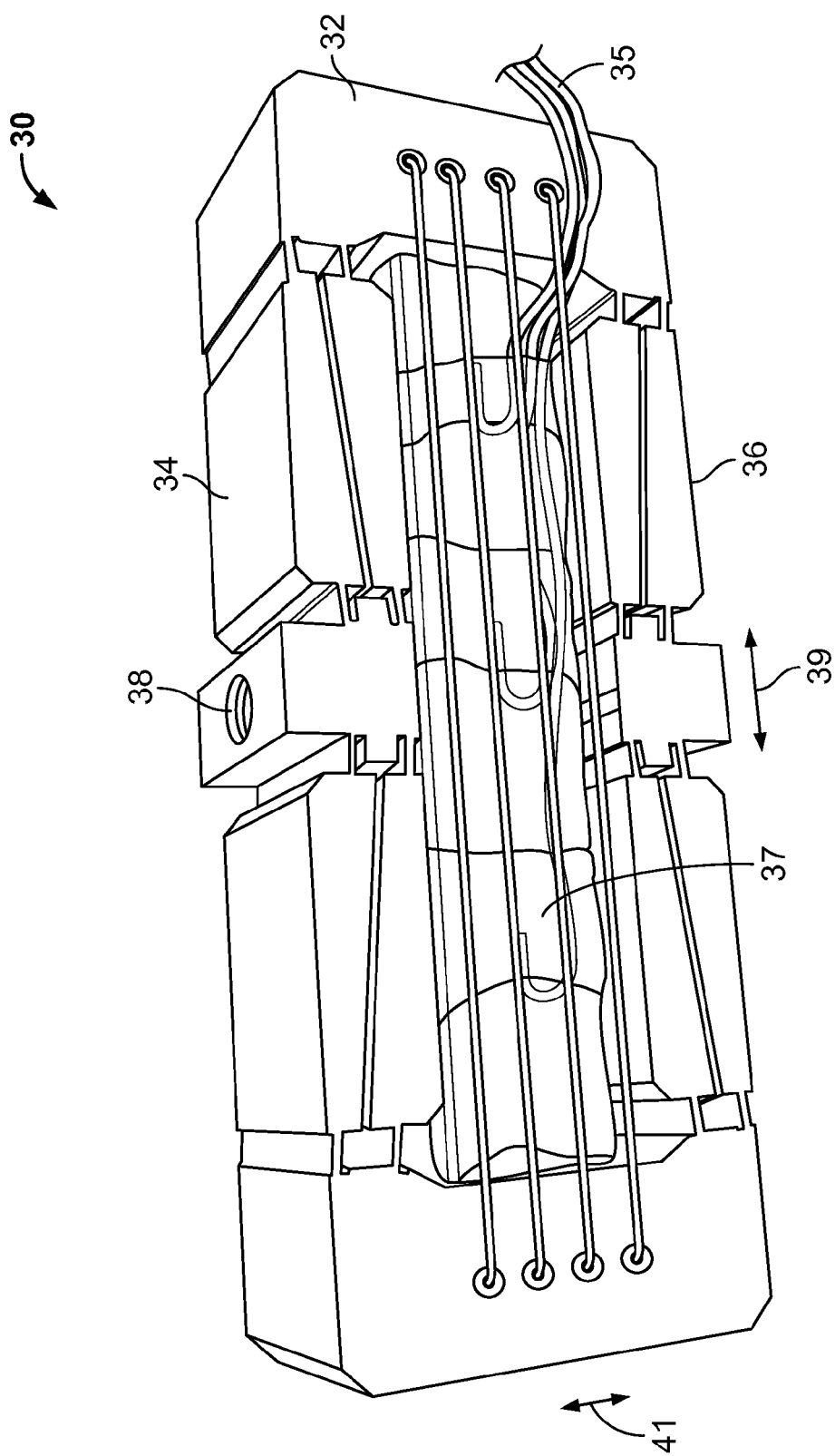
FIG. 3 is a perspective view of a piezoelectric actuator used in the valve of FIGS. 1-2.

Referring to FIG. 3, piezoelectric actuator 30 includes a frame 32 having top and bottom surfaces 34, 36. Frame 32, in some cases, is composed of a metallic material. A piezoelectric element 37 is positioned inside frame 32 and, upon an electric current (e.g., a DC voltage) being applied to piezoelectric element 37, it expands in a lateral direction as indicated by arrow 39. In an embodiment, piezoelectric element 37 is a ceramic capacitor. Thus, once piezoelectric element 37 is charged and caused to change shape, element 37 stores energy resulting from the charge and remains in the changed shape (e.g., expanded) until discharged. Wiring/electronic cable 35 is connected to piezoelectric element 37 for charging and discharging element 37. Likewise, an electrical connection 13 may be included with valve 10 for supplying power to piezoelectric actuator 30 and/or other components of valve 10 (e.g., electronic control board 12).

Due to the geometry of frame 32, lateral expansion of piezoelectric element 37 in the direction of arrow 39 results in vertical movement of frame 32 in the direction of arrow 41. As such, vertical movement of piezoelectric frame 32 can be controlled by electronic control board 12 upon charging or discharging element 37. Namely, when element 37 is charged it can expand and cause vertical movement of frame 32, and when element 37 is discharged it can return to its original shape and cause frame 32 to likewise return to its original shape. As shown, the direction of arrow 41 is substantially transverse to the direction of arrow 39.

Figure 4:
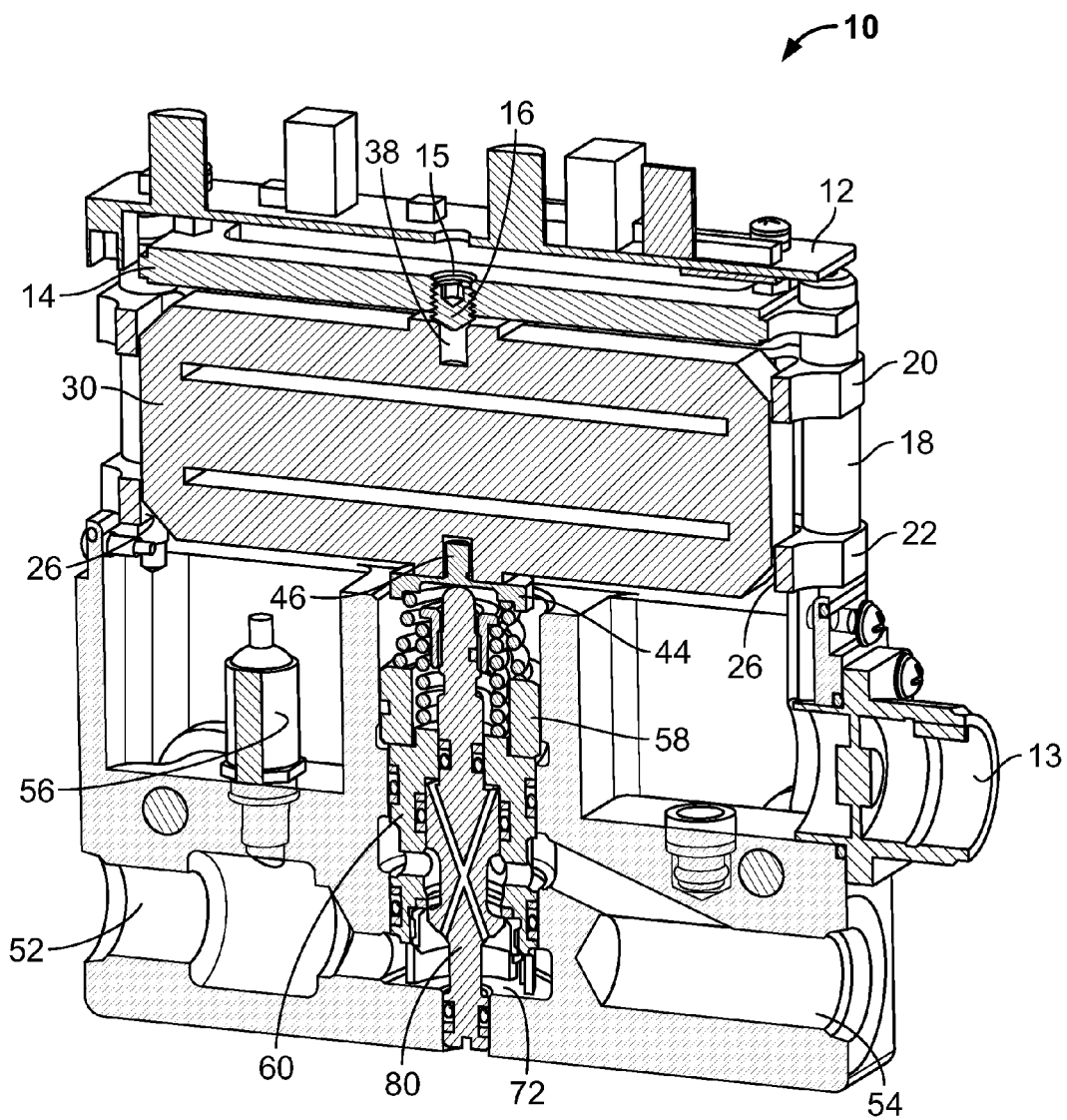
FIGS. 4-5 are cross-sectional and close-up cross-sectional views of the valve of FIGS. 1-2.

Referring to FIGS. 2 and 4, piezoelectric actuator 30 is constrained between separate supports 20, 22 within valve 10. Each support 20, 22 includes a number of openings (e.g., four (4)) for accepting respective columns 18, as well as surfaces 26 that confront the sides of piezoelectric actuator 30 to constrain it in a lateral direction. In an embodiment, the surfaces 26 of supports 20, 22 that confront piezoelectric actuator 30 form roughly a rectangle and constrain actuator 30 so that it is substantially fixed in all lateral directions, but is movable in the vertical direction. In this regard, columns 18 attach to main valve body 50 and extend upwards therefrom to an actuator support board 14, which is fixed relative to body 50 in one embodiment. As shown in FIG. 4, support board 14 is attached to columns 18 and includes a central opening 15 for receiving a post 16. Post 16 and opening 15 are threaded in an embodiment so that post 16 may be screwed into opening 15 and engage an opening 38 formed in top surface 34 of frame 32 of piezoelectric actuator 30. In this way, actuator support board 14 contacts piezoelectric actuator 30 and prevents its movement upwards in the vertical direction. Because support board 14 is fixed in location and contacts piezoelectric actuator 30 via post 16, vertical expansion of actuator 30 in a vertical direction towards support board 14 will be limited and, in some cases, prevented altogether. As such, any expansion of piezoelectric actuator 30 in the vertical direction, as hereinbefore described, results in movement of bottom surface 36 of actuator 30 in a downwards direction. Additionally, during such movement, supports 20, 22 and columns 18 act to guide and constrain piezoelectric actuator 30 to focus its vertical movement at a desired point.

Figure 5:
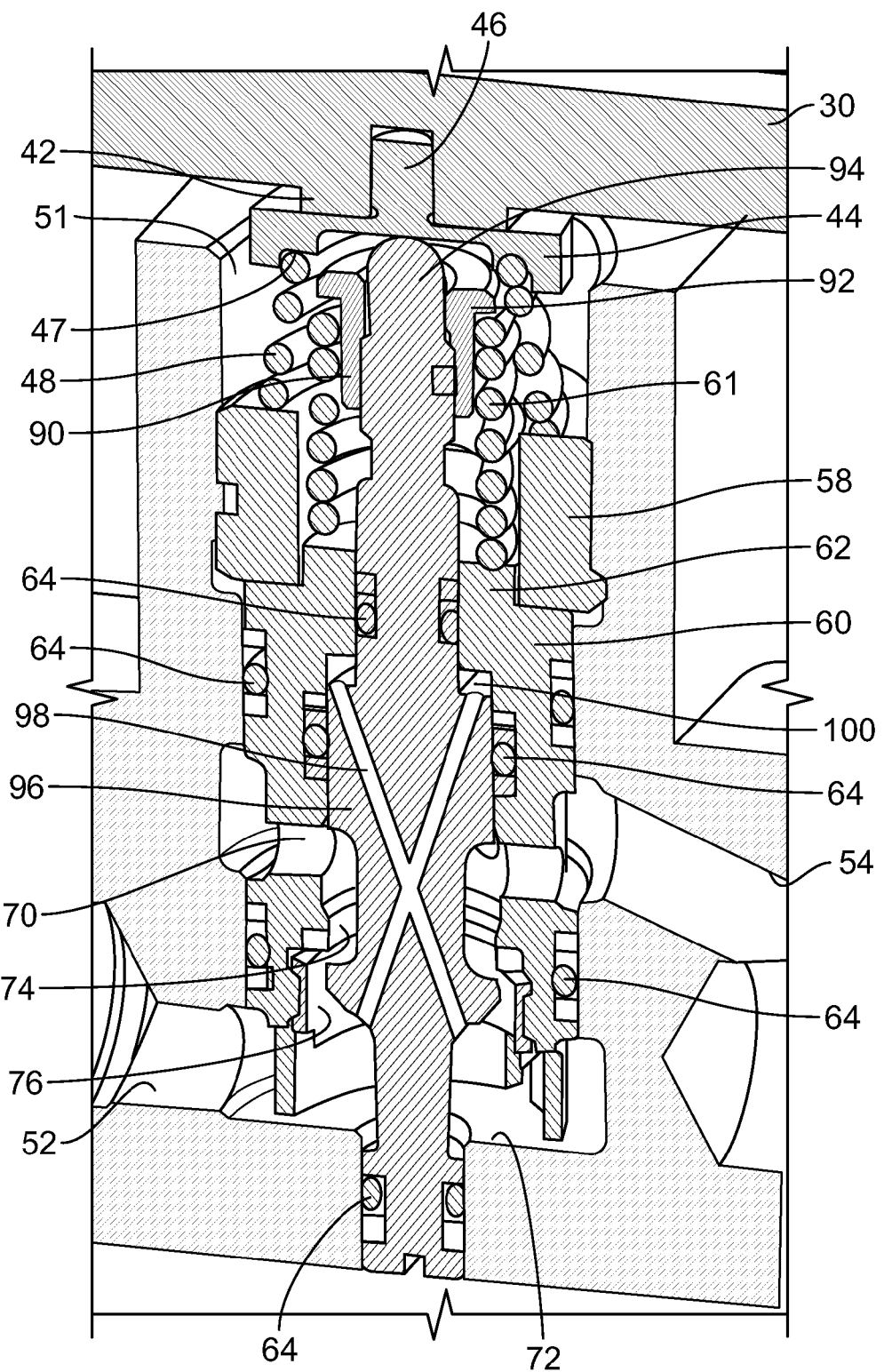

Bottom surface 36 of piezoelectric actuator 30, as shown in FIG. 5, also includes a projection 42 having an opening for receiving an upwardly-extending post 46 of a disc 44. Projection 42 contacts disc 44 and receives post 46 thereof for stability, such that movement of piezoelectric actuator 30 downwards causes movement of disc 44 in the same direction.

A poppet 80 is engaged with disc 44, as shown in FIGS. 4-5, such that movement of disc 44 results in movement of poppet 80. Such movement of poppet 80 ultimately allows for operation of valve 10 and transfer of fluid therethrough, as described in more detail below.

Referring to FIGS. 4-5, disc 44 includes a circumferential recess 47 that accepts a spring 48 for biasing disc 44 in an upwards direction. A cage retainer 58 is situated in a main vertical opening 51 in valve body 50, which acts to support spring 48 at a bottom surface/coil thereof. Thus, spring 48 is situated within vertical opening 51 and is sandwiched between cage retainer 58 and disc 44. As cage retainer 58 is fixed in location, and an expanded dimension of spring 48 is larger than a distance between cage retainer 58 and disc 44, spring 48 acts to bias disk 44 upwardly so that post 46 of disc 44 remains situated in the opening of projection 42 and disc 44 contacts piezoelectric actuator 30.

Cage retainer 58 is press fit, threaded, or otherwise fixedly positioned within vertical opening 51 of valve body 50 and acts to retain a cage 60 that limits movement of poppet 80. Cage retainer 58, in an embodiment, is cylindrical in shape to fit within the cylindrical shape of vertical opening 51. Cage 60 extends downwards within vertical opening 51 to a floor surface 72, and thus, cage 60 is securely fit between floor 72 and cage retainer 58. Cage 60 includes a cylindrical end 62 that fits within cage retainer 58 and also forms a support surface for another spring 61. Spring 61 is supported on cylindrical end 62 of cage 60 within cage retainer 58, and extends upwards to contact a poppet seat 90. Poppet seat 90 has a flange 92 and a cylindrical body. Spring 61 extends around the cylindrical body to contact flange 92. Further, poppet seat 90 is fixedly attached to poppet 80 (e.g., by press fitting, threading, welding, or another connection), such that spring 61 acts to bias poppet 80 upwardly to contact disc 44. In particular, spring 61 acts on flange 92 of poppet seat 90 which, due to its connection with poppet 80, causes poppet 80 to be normally urged in an upward direction. This is, again, as a result of spring 61 being sandwiched between cylindrical end 62 and flange 92 of poppet seat 90 and having an expanded dimension, which is greater than a distance between cylindrical end 62 and flange 92.

As shown in FIG. 5, cage 60 includes a stepped chamber for poppet 80, and a cross-channel or opening 70 for allowing fluid to flow through cage 60 upon movement of poppet 80 into an open or partly-open position. In an embodiment, a bottom end of cage 60 also includes a seat 74 for contacting a portion of poppet 80, and a seat retainer 76 that is threaded, press-fit, or otherwise fixedly attached within cage 60 so as to retain seat 74 in place within cage 60. In particular, seat 74 may lie against one of the steps of the stepped chamber of cage 60.

Various seals 64 are also situated about poppet 80 and/or cage 60 at different points within main valve body 50. Seals 64, in one embodiment, are in the form of O-rings that establish a fluid-tight seal between the structures associated with the particular seal 64. Thus, seals 64 act to prevent fluid travelling through or within undesired areas of valve body 50, as described in more detail below. As an example, a seal 64 is positioned about an upper and a lower portion of cage 60 within vertical opening 51 so as to establish a fluid-tight seal between those structures. Further examples are set forth below.

Still referring to FIGS. 4-5, poppet 80 includes an upwardly-extending post 94 that is positioned within poppet seat 90 and partially within cage 60 (e.g., its cylindrical end 62). A seal 64 is positioned around post 94 of poppet 80 in this area to prevent fluid from moving past seal 64 and into the area of cage retainer 58. Likewise, a seal 64 is also positioned about cage 60 adjacent its cylindrical end 62 so that fluid cannot move towards the area of cage retainer 58 around the outside of cage 60. This seal 64 is described in the example above as the seal 64 around the upper portion of cage 60. Post 94 of poppet 80 is also sized so as to be able to reciprocate freely within cage 60 (e.g., its cylindrical end 62).

Poppet 80 also has a main body 96 having one or more channels 98. In a particular implementation, poppet 80 has two (2) channels 98 that intersect each other at an angle within main body 96. Channels 98 are effective to allow fluid to travel from an inlet or outlet side (depending upon the mode of operation) of valve 10, through main body 96, and subsequently to an area 100 past main body 96. Area 100 is additionally sealed from the main fluid pathway for valve 10 via a seal 64 positioned about main body 96 of poppet 80, and is further sealed from the area within cage retainer 58 via a seal 64 situated about post 94 of poppet 80. As such, fluid is able to pass from the inlet or outlet side of valve 10 and into area 100 and is effective to relieve pressure borne by poppet 80 on the inlet or outlet side (e.g., at seat 74). Stated differently, since fluid can travel through channels 98 and into area 100, pressure is to some extent equalized between area 100 and the inlet side of valve 10. As such, only a small amount of force is needed to cause downward movement of poppet 80 within vertical opening 51 in main valve body 50 since pressure between the inlet side of valve 10 and area 100 is, for the most part, equal.

In use, multi-function valve 10 may be utilized for pressure reduction, pressure relief, and/or pressure regulation (e.g., when using 2 valves 10 side-by-side). In an embodiment, port 52 may be coupled to a source of fluid by way of a conduit (not shown) and port 54 may be coupled to an outlet conduit (not shown). Alternatively, as alluded to above, port 54 may be coupled to the source of fluid by way of a conduit (not shown) and port 52 may act as the outlet connected to an outlet conduit (not shown). The former configuration is used in pressure relief operations, while the latter configuration is used for pressure reduction. Valve 10 may be used in a wide range of industrial, space, or defense applications due to its high-pressure design, wide range of operating temperatures, hermetic design, and good resistance to external dynamic loads (shock and vibration).

In a pressure-relief operation, fluid may be forced from the fluid source at some set pressure and be caused to enter inlet/port 52 of main valve body 50. The fluid may encounter poppet 80, which is sealed against seat 74, as shown in FIG. 4. Thus, a fluid-tight seal is established at that area to prevent fluid from reaching port/outlet 54 through cross channel 70 of cage 60. Meanwhile, fluid is allowed to enter into channels 98 of poppet 80 and travel to area 100 to establish an equilibrium of pressure between the inlet side of valve 10 and area 100. In an alternate embodiment, the fluid present in area 100 may not fully equalize the pressure between area 100 and the inlet side of valve 10, but it may lessen or mitigate the pressure differential to an acceptable degree. In this manner, poppet 80 can more freely and easily move downwards against the pressure created by the fluid source against poppet 80 in the area of seat 74.

Pressure transducer 56 acts to measure the fluid pressure created by the fluid source coupled to inlet/port 52 and simultaneously sends readings thereof to electronic control board 12 (e.g., through wireless or wired means). Again, pressure transducer 56 could alternatively or in addition include temperature or flow sensors. Electronic control board 12 may be programmable at a user's discretion so that, when a particular pressure reading is provided by pressure transducer 56, electronic control board 12 directly or indirectly provides a particular voltage to piezoelectric actuator 30. Alternatively, control board 12 may conversely discharge piezoelectric actuator 30 by some degree. This can cause corresponding vertical movement of frame 32 of piezoelectric actuator 30, such that poppet 80 can be placed in an open, partly open, or closed state (e.g., as shown in FIG. 5). In a particular embodiment, upon receiving a particular pressure reading (e.g., a reading that is outset a pre-set pressure value or range of values), electronic control board 12 can issue a commend that causes wiring/cable 35 of piezoelectric actuator 30 to charge or discharge actuator 30. As an example, upon charging piezoelectric actuator 30 by some degree via wiring/cable 35, piezoelectric element 37 can expand and cause vertical expansion of frame 32, thereby resulting in downward movement of bottom surface 36 of actuator 30 as well as disc 44 engaged therewith. Such movement causes poppet 80 to move downwardly away from seat 74 into an open or partly-open position. As shown in FIG. 5, poppet 80 is spaced apart from seat 74 in the open or partly-open position to allow fluid to travel from inlet/port 52, through the space, through channel 70 in cage 60, and out of outlet/port 54.

Valve 10 can act as a pressure-relief or back-pressure-regulation system in that pressure transducer 56 can be programmed with an upper limit pressure value and, upon reaching that value, pressure transducer 56 sends a signal to electronic control board 12 to allow pressure relief at inlet/port 52. Stated differently, a certain amount of fluid pressure may build up at the inlet side of valve 10 (the side of inlet/port 52) and, once that pressure reaches a predetermined maximum value, as measured by pressure transducer 56, pressure transducer 56 may send a signal to electronic control board 12 to open valve 10 by causing poppet 80 to move from a closed position against seat 74 to an open or partly-open position spaced apart from seat 74. In this way, the pressure build up at the inlet side of valve 10 may be relieved. Such pressure build up may be a cyclical event for a certain system (e.g., pressure may build up slowly over time and periodically be relieved by way of valve 10).

After performing a specific pressure-relief or back-pressure-regulation function, as described above, valve 10 may then be closed (where applicable) by causing poppet 80 to move upwardly and seal against seat 74. In particular, pressure transducer 56 may send a signal to electronic control board 12, which may then issue a command to discharge piezoelectric element 30 via wiring/cable 35. This causes contraction of piezoelectric element 37 in a lateral direction and results in likewise contraction of frame 32 in a vertical direction, thereby ultimately moving poppet 80 upwardly against seat 74. In an embodiment, the normal bias of poppet 80 in the upward direction via spring 61 causes poppet 80 to move upwards once downward pressure on poppet 80 from piezoelectric actuator 30 and disc 44 is withdrawn.

In other configurations, as noted above, valve 10 can act as a pressure-reduction mechanism. In this configuration, port 54 acts as an inlet and port 52 acts as an outlet. In particular, inlet/port 54 may be coupled with a source of fluid and poppet 80 placed in a partly-open position to allow fluid to flow past pressure transducer 56 and out of outlet/port 52. In this instance, pressure transducer 56 can act to maintain poppet 80 in a particular open or partly-open position to maintain an appropriate degree of fluid pressure at the outlet side of valve 10 (the side of outlet/port 52). For instance, if a desired degree of pressure at outlet/port 52, as determined by pressure transducer 56, goes out of a predetermined range (or simply outside of a specified pressure value), pressure transducer 56 can send a signal to electronic control board 12 causing movement 80 of piezoelectric actuator 30 and corresponding movement of poppet upwards or downwards. Such movement changes the fluid pressure at outlet/port 52 back to within the desired range (or returns the pressure to the desired specific value) by altering the amount of fluid traveling from inlet/port 54 to outlet/port 52. In other words, electronic control board 12 is operative to control the degree of openness of valve 10 to effectively regulate fluid pressure and act as a pressure-reduction mechanism. In this configuration, as with above, fluid may also be allowed to flow through main body 96 of poppet 80 via channels 98, and to area 100, so that pressure is somewhat equalized between inlet/port 54 and outlet/port 52 and poppet 80 is freely able to move upwards and/or downwards.

In the devices depicted in the figures, particular structures are shown that are adapted for use in a valve system. The use of alternative structures for such purposes, including structures having different lengths, shapes, and configurations is also contemplated. As an example, although the valve 10 is described as being actuated in response to pressure readings, it may alternatively be actuated in different systems by any combination of pressure, temperature, and/or flow readings. For instance, if a temperature sensor is used in place of or in addition to pressure transducer 56, the temperature sensor may act as an adjunct or substitute for pressure transducer 56. In particular, during use as a pressure relief system, while an upward limit for pressure at the inlet side of valve 10 (the side of port 52) may normally trigger opening of valve 10, the addition of a temperature sensor may establish yet another condition for opening valve 10. In this case, not only would the pressure at the inlet side of valve 10 (the side of port 52) need to reach a certain level, but the temperature of the fluid at the inlet side would also need to reach a certain degree (e.g., either high or low) for valve 10 to open. Similarly, a flow sensor could be added to the system as another adjunct or alternatively a substitute. In this case as well, fluid flow as measured by the flow sensor could establish its own condition for opening or closing of valve 10, or it may establish yet another precondition in a line of conditions that must be satisfied before valve 10 is caused to open or close. Thus, any combination of the foregoing is possible for actuation of valve 10.

Although aspects of the invention herein have been described with reference to particular embodiments, it is to be understood that these embodiments are merely illustrative of certain features of the present invention. It is therefore to be understood that numerous modifications may be made to the illustrative embodiments and that other arrangements may be devised without departing from the spirit and scope of the present invention as defined by the appended claims. For instance, the features described in connection with individual embodiments may be shared with others of the described embodiments.

It will also be appreciated that the various dependent claims and the features set forth therein can be combined in different ways than presented in the initial claims. In particular, it is expressly understood that any feature provided in any dependent claim may be shared with any other claim, to the extent technologically feasible.

The invention claimed is:

1. A valve comprising:
    a main valve body having a first port in fluid communication with a first conduit and a second port in fluid communication with a second conduit;
    a movable poppet positioned within the main valve body, the movable poppet being moveable from a first closed position in which the poppet establishes a fluid-tight seal with a sealing member, which is effective to prevent fluid flow from the first port to the second port, to a second open position in which the poppet is spaced apart from the sealing member and fluid is permitted to flow from the first port to the second port; and
    a piezoelectric actuator having a piezoelectric element and a frame, the frame being engaged with the poppet and effective to move the poppet amongst a plurality of different positions between the first closed position and the second open position; and
    an electronic cable coupled with the piezoelectric actuator for charging or discharging the piezoelectric element, the piezoelectric element being laterally expandable upon receiving a charge from the electronic cable and is laterally contractible upon being discharged, expansion of the piezoelectric element resulting in corresponding vertical expansion of the frame of the piezoelectric actuator and contraction of the piezoelectric element resulting in corresponding vertical contraction of the frame of the piezoelectric actuator, wherein vertical expansion and contraction of the frame of the piezoelectric actuator results in movement of the poppet amongst the plurality of different positions.

2. The valve of claim 1 further comprising a sensor and an electronic control board, wherein the sensor is communicatively coupled with the electronic control board and the electronic control board is effective to accept readings from the sensor and issue a command causing the piezoelectric actuator to move the poppet amongst the plurality of different positions.

3. The valve of claim 1, wherein the poppet includes a main body with at least one channel, the channel having a first opening on a first side of the valve and a second opening leading to a pressure-equalization area, the channel being effective to allow fluid to flow from the first side to the pressure-equalization area to mitigate a pressure differential between the first side and the pressure-equalization area.

4. The valve of claim 1, wherein the poppet is engaged with a spring that biases the poppet into the first closed position.

5. A valve comprising:
a main valve body having a first port, a second port, and a fluid path extending from the first to the second port;
a movable poppet positioned within the main valve body, the movable poppet being moveable to a plurality of different positions effective to place the fluid path in a closed, partly-open, or open state;
a piezoelectric actuator having a piezoelectric element and a frame, the frame being engaged with the poppet and effective to move the poppet amongst the plurality of different positions;
a sensor effective to ascertain an environmental condition of the valve;
an electronic control board communicatively coupled with the sensor, wherein the sensor transmits readings pertaining to the valve's environmental condition to the electronic control board, and the electronic control board is effective to accept such readings and issue a command causing the piezoelectric actuator to move the poppet from a first of its plurality of different positions to a second of its plurality of different positions;
an electronic cable coupled with the electronic control board and the piezoelectric actuator, wherein the command issued by the electronic control board results in charging or discharging the piezoelectric element via the electronic cable, wherein the piezoelectric electric element is laterally expandable upon receiving a charge via the electronic cable and is laterally contractible upon being discharged, wherein expansion of the piezoelectric element results in corresponding vertical expansion of the frame of the piezoelectric actuator and contraction of the piezoelectric element results in corresponding vertical contraction of the frame of the piezoelectric actuator, and wherein vertical expansion and contraction of the frame of the piezoelectric actuator results in vertical movement of the poppet amongst the plurality of different positions.

6. The valve of claim 5, wherein the sensor is at least one of a pressure sensor, a flow sensor, and a temperature sensor.

7. The valve of claim 5, wherein the frame of the piezoelectric actuator includes a top and a bottom surface, and the valve further comprises a fixed support contacting the top surface of the frame and constraining movement of the frame in a downwards direction.

8. A method of operating a valve comprising:
providing a valve having a main valve body with a first port, a second port, and a fluid path extending from the first port to the second port;
sensing an environmental condition of fluid flowing from the first port towards the second port by way of a sensor positioned in the main valve body; and
charging or discharging a piezoelectric element of a piezoelectric actuator in response to a triggering event sensed by the sensor, the charging or discharging of the piezoelectric element causing the piezoelectric element to laterally expand upon receiving a charge and laterally contract upon being discharged causing a poppet engaged with the piezoelectric actuator to move vertically between a first position in which the fluid path is sealed and a second position in which the fluid path is open or partly open.

9. The method of claim 8, wherein the sensor is at least one of a pressure sensor, a flow sensor, and a temperature sensor, and the triggering event occurs when the sensor senses that at least one of the pressure, flow, and temperature of the fluid flowing from the inlet towards the outlet is outside of a predetermined value or range of values.

10. The method of claim 8 further comprising reducing pressure acting on the poppet when in its first sealed position by allowing fluid to flow past a main body portion of the poppet and into a pressure-equalization area beyond the main body portion, the pressure-equalization area being sealed from the second port.

11. The method of claim 10, wherein the poppet is biased towards the first sealed position by way of a spring acting on the poppet.

12. The method of claim 8 further comprising:
sending information pertaining to the environmental condition sensed by the sensor to an electronic control board; and
using the electronic control board to determine whether a triggering event has occurred and, if a triggering event is detected, sending a command to the piezoelectric actuator to move the poppet between the first sealed position and the second open or partly-open position.

* * * * *